United States Patent [19]

Zuerner et al.

[11] Patent Number: 5,397,496

[45] Date of Patent: * Mar. 14, 1995

[54] COMPOSITION FOR THE TREATMENT OF OVERSPRAY IN PAINT SPRAY BOOTHS CONTAINING SECONDARY ALCOHOL ESTERS

[75] Inventors: Edwin C. Zuerner, Troy; Robert A. Patzelt; Norman Foster, both of Bloomfield Hills, all of Mich.

[73] Assignee: Nortru, Inc., Detroit, Mich.

[ * ] Notice: The portion of the term of this patent subsequent to Mar. 30, 2010 has been disclaimed.

[21] Appl. No.: 38,011

[22] Filed: Mar. 29, 1993

Related U.S. Application Data

[63] Continuation-in-part of Ser. No. 861,091, Mar. 31, 1992, Pat. No. 5,198,143, which is a continuation-in-part of Ser. No. 790,650, Nov. 8, 1991, Pat. No. 5,200,104.

[51] Int. Cl.$^6$ .............................................. C11D 7/50
[52] U.S. Cl. .................................... 252/170; 252/546; 252/547; 252/DIG. 8
[58] Field of Search ................. 252/170, DIG. 8, 546, 252/547

[56] References Cited

U.S. PATENT DOCUMENTS

| | | |
|---|---|---|
| 4,130,674 | 12/1978 | Roberts et al. . |
| 4,265,944 | 5/1981 | Garner . |
| 4,276,064 | 6/1981 | Gerdes . |
| 4,289,505 | 9/1981 | Hardison et al. . |
| 4,295,845 | 10/1981 | Sepulveda et al. . |
| 4,339,248 | 7/1982 | Garner . |
| 4,378,235 | 3/1983 | Cosper et al. . |
| 4,396,405 | 8/1983 | Lindenberger et al. . |
| 4,444,573 | 4/1984 | Cosper et al. . |
| 4,504,395 | 3/1985 | Harpel et al. . |
| 4,523,932 | 6/1985 | Cosper et al. . |
| 4,554,026 | 11/1985 | Cosper et al. . |
| 4,563,199 | 1/1986 | Lindenberger et al. . |
| 4,750,919 | 6/1988 | Patzelt et al. . |
| 4,769,172 | 9/1988 | Siklosi . |
| 4,780,235 | 10/1988 | Jackson . |

(List continued on next page.)

OTHER PUBLICATIONS

Eastman Chemicals Product Brochure for Texanol, Publication No. M158H, May, 1990.
Eastman Chemical Products, Inc. Material Safety Data Sheet "Texanol" Ester-Alcohol, May 19, 1989.
Eastman Chemical Products, Inc. Material Safety Data Sheet "Kodaflex" TXIB Plasticizer, Aug. 3, 1990.

*Primary Examiner*—Helen M. S. Sneed
*Assistant Examiner*—E. D. Irzinski
*Attorney, Agent, or Firm*—Basile and Hanlon

[57] ABSTRACT

A composition for treating oversprayed paints that contains an effective amount of a carbonyl compound such as alcohol esters and condensation products of alcohol esters and carboxylic acid in water together with a suitable surfactant. The carbonyl compound is capable of dissolving paint while remaining non-reactive with water. The alcohol ester employed has the general formula:

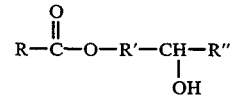

The alcohol ester derivative employed has the general formula:

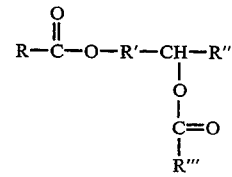

R' and R" are a substituted or unsubstituted linear alkyl group containing 1 to 8 carbon atoms, R and R'" are linear or branched alkyl groups containing 1 to 10 carbon atoms, and R and R'" are either identical or different alkyl functionalities.

15 Claims, No Drawings

U.S. PATENT DOCUMENTS

| | | |
|---|---|---|
| 4,781,916 | 11/1988 | Papaphilippou . |
| 4,812,255 | 3/1989 | Suwala . |
| 4,814,092 | 3/1989 | Patzelt . |
| 4,854,947 | 8/1989 | Patzelt . |
| 4,919,691 | 4/1990 | Patzelt et al. . |
| 4,927,556 | 5/1990 | Pokorny . |
| 4,941,491 | 7/1990 | Goerss et al. . |
| 4,948,513 | 8/1990 | Mitchell . |
| 4,956,115 | 9/1990 | Van De Mark . |
| 5,019,138 | 5/1991 | Farrah et al. . |
| 5,076,939 | 12/1991 | Hunter et al. . |
| 5,084,200 | 1/1992 | Dishart et al. . |
| 5,098,450 | 3/1992 | Patzelt et al. . |
| 5,198,143 | 3/1993 | Zuerner et al. ............ 252/170 |
| 5,200,104 | 4/1993 | Zuerner et al. ............ 252/170 |

COMPOSITION FOR THE TREATMENT OF OVERSPRAY IN PAINT SPRAY BOOTHS CONTAINING SECONDARY ALCOHOL ESTERS

BACKGROUND OF THE INVENTION

Cross Reference to Related Applications

The present application is a continuation-in-part of Ser. No. 07/861,091, filed on Mar. 31, 1992, (now U.S. Pat. No. 5,198,143) which itself is a continuation-in-part application of Ser. No. 07/790,650, filed Nov. 8, 1991, (now U.S. Pat. No. 5,200,104).

FIELD OF THE INVENTION

This invention pertains to compositions suitable for the treatment, removal and/or containment of paint overspray, paint particles, and/or the various non-volatile components of paints, lacquers, enamels and the like. More specifically, this invention relates to compositions containing organic materials which can disperse and solubilize paint constituents in an aqueous medium. This invention also pertains to paint overspray treatment compositions which remain effective over prolonged periods of use on a variety of different paint formulations.

DISCUSSION OF THE RELEVANT ART

Large quantities of paint of various kinds, including lacquers, varnishes, enamels, and certain specialty paints such as urethane-based paints, catalyzed two-component paints, base coat/clear coat combination paints, high solids enamels or lacquers, and the like, are used to coat finished products in industries such as automotive manufacture and the like. These paints, lacquers and varnishes are generally solvent-based; however, certain of these paints can be water-based. Some are considered low solids paints (i.e. materials containing about 20 to about 30% solids) while others are considered high solids paints (i.e. those containing above 50% solids).

These coatings or paint materials are generally sprayed onto the piece to be painted or coated in an enclosed area such as a paint spray booth. In this operation, substantial quantities of solvent and oversprayed paint are discharged into the spray booth and the air drawn therein. Paint spray booths provide a means for capturing and containing paint overspray components. The method of choice is to contain the solid overspray material components in a suitable liquid material.

Paint spray booths generally include a chamber, a duct system for passing air through the chamber, and a sump containing circulating liquid located in the bottom of the chamber which can be directionalized in the spray booth chamber to form a curtain of liquid to contact the over-sprayed paint particles and volatile organic solvents and collect portions thereof. The paint spray booth also contains a gas discharge means such as a stack for discharging excess air or gaseous material. The paint spray booth is equipped with baffles or eliminators to reduce particulate carryout to acceptable levels such that most of the solids are retained in the paint spray booth wash water.

The liquid employed in paint spray booth applications is most preferably a hydrophilic material capable of removing solid particulates from the air. The liquid chosen ideally is economical and safe to use. The hydrophilic material of choice typically is comprised of water to which various chemicals are added to provide detackifying properties. Water-based compositions are also desirable for their general ease and safe handling during operation and during spray booth clean-up and maintenance. There are several drawbacks with such water-based systems. These include inconsistent paint kill and detackification, deposits on surfaces, accumulation of paint sludge, increased wet-sludge handling and disposal, and the weak performance of water-based systems as paint dispersants or solubilizers.

In contrast to water systems, various organic solvent systems have been proposed for use in paint spray booth applications; i.e. a solvent composition employing a solvent such as n-methyl pyrrolidone as disclosed in U.S. Pat. No. 5,019,138 to Farrah and U.S. Pat. No. 4,941,491 to Goerss. In solvent-based compositions, problems may be encountered during other operations in the paint spray booth employing water, such as routine cleaning and maintenance and fire protection. In addition, the fluid properties of the solvent are likely to cause changes in the performance of the spray booth. Thus, paint spray booths may require modifications to successfully utilize solvent-based systems. It can be readily appreciated that such measures may be cumbersome and expensive.

Heretofore, one improvement has been to employ oil-in-water formulations in which water, oil and various additives are combined to form a suitable emulsion as the hydrophilic liquid of choice. The use of such oil-in-water emulsions is taught in U.S. Pat. Nos. 4,378,235, 4,396,405, 4,523,932, 4,563,199, 4,444,573, 4,544,026, 4,750,919, and 4,919,691, all of which are incorporated herein by reference.

Oil-in-water emulsions have been employed to contain greater volumes of paint solids than contained in water alone. However, the amount contained in such compositions is generally no greater than 4–6% by volume. There is no evidence to indicate that the oil-in-water emulsions currently in use dissolve or solubilize the paint which they contact. Thus, the capacity of the emulsion is limited to its dispersion capabilities and this is generally a function of the concentration of oil. In order to be effective, oil-in-water emulsions generally contain in excess of 25% by volume oil. In large capacity spray booths, this represents a significant material handling activity as well as increased operating expense.

These oil-in-water emulsions are generally weak alkaline emulsions which are easily broken. In order to maintain the material in an emulsified state, it is necessary to employ emulsion stabilizing additives, paying close attention to composition pH, and in many instances, requiring continued mechanical agitation.

Many of the patents previously enumerated provide various approaches for addressing some or all of the shortcomings inherent in oil-in-water emulsions. Of these, U.S. Pat. No. 4,919,691 to Patzelt et al has been one of the more effective. U.S. Pat. No. 4,919,691 to Patzelt et al discloses an oil-in-water emulsion which includes a process oil, a suitable oil-in-water emulsifier; and a non-polar organic solvent chosen from the group consisting of dialkyl esters of dibasic acids (DBE) such as dimethyl adipate, dimethyl glutarate, or dimethyl succinate in combination with water. Such additives were included in oil-in-water formulations to increase paint solids capacity in the emulsion to improve paint solids recovery. However, oil-in-water formulations containing DBE have significant drawbacks. DBE readily hydrolyzes to form water-soluble products which are difficult to remove from water. The products of hydrolysis consume caustic, which thereby lowers the pH of the emulsion, thus jeopardizing its already poor stability. Thus, both caustic and DBE must be replenished to ensure emulsion stability and effectiveness. This fact, and the fact that DBE is not recoverable from the spent material, represent significant drawbacks for any program utilizing oil-in-water formulations containing DBE.

Given the problems encountered with the various hydrophilic liquids currently available, there has been some incentive for manufacturers to switch to alternative technologies for paint spray containment and recovery. However, paint spray booths generally represent major items of capital investment so that wholesale replacement would be prohibitively expensive. Thus, it is highly desirable to develop a liquid composition which performs better and overcomes some of the drawbacks attributable to the circulating fluid in existing paint spray booth systems.

In U.S. Ser. No. 07/790,650 (now U.S. Pat. No. 5,200,104), the inventors proposed a paint overspray treatment composition which is composed of a carbonyl compound selected from the group consisting of secondary alcohol esters, condensation products of secondary alcohol esters and carboxylic acid, and mixtures thereof in combination with an emulsifier and water. In a related application, U.S. Ser. No. 07/861,091 (now U.S. Pat. No. 5,198,143), the inventors proposed an enhanced paint overspray treatment composition which is composed of alcohol esters, condensation products of alcohol esters and carboxylic acid and mixtures thereof in combination with an emulsifier, a surfactant and water.

In operation, use of these materials has met with significant success. However, problems collateral to the use of emulsifiers with compositions containing the secondary alcohol ester materials have arisen. Specifically, problems related to composition foaming and stability have made it highly desirable to pursue innovations on the paint overspray treatment solution employed in the prior compositions to eliminate or reduce composition foaming.

In practice it has been found that water evaporation rates encountered in actual operation of the paint spray booths can be so high as to require make up volumes as high as 50% of the total sump volume. This results in concentration of the essentially non-volatile organic components of the composition. With continued concentration, the amount of emulsifier which is present as the acid salt increases. Acid salts of emulsifiers such as oleic acid can result in a significant foaming problem at pH above about 8.7 particularly as the system experiences a decline in the concentration of carbonyl compound.

Use of hard water presents additional problems pertaining to emulsion stability in which oleic acid is converted to calcium oleate which in turn reacts with the carbonyl compound to form a separate layer which is non-miscible with the bulk solution.

Heretofore it was felt that foaming was a necessary tradeoff for emulsion stability. However, it is highly desirable to provide a suitably stable aqueous emulsion or emulsion-like composition which has a greater capacity for containing paint either by solubilization, dispersion, or a combination of the two which does not possess the inherent foaming problems. It would also be desirable to provide a stable aqueous composition in which contained paint is maintained rather than being permitted to settle out freely.

It is also desirable that the aqueous composition be made up of chemically stable components which retain their effectiveness in composition for a protracted period of time and which can be readily separated and recovered from the composition when required. It is also desirable that all components in the composition be economical and safe to handle and use. Finally, it is desirable that the composition employed require lower concentrations of active ingredients to achieve effective paint containment than previously obtainable and that the paint sludge thus contained be recoverable in a form which is easy to handle and process.

SUMMARY OF THE INVENTION

The present invention is a composition for treating oversprayed paints which consists essentially of:
a. an effective amount of an essentially non-volatile carbonyl compound selected from the group consisting of alcohol esters, condensation products of alcohol esters and carboxylic acid, and mixtures thereof, the carbonyl compound being capable of dissolving paint and remaining essentially insoluble and non-reactive in an aqueous media;
b. a surfactant selected from the group consisting of ethoxylated alkyl phenols having an average ratio of moles of ethylene oxide to moles of alkyl phenol between about 4:1 and about 12:1; and
c. water.

The carbonyl compound employed in the composition of the present invention is selected from compounds having the general formulae:

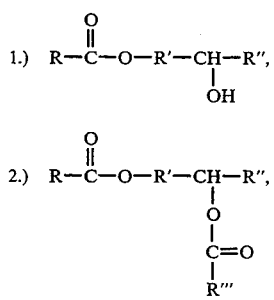

and mixtures thereof; wherein R' and R'' are chosen from the group consisting of substituted or unsubstituted linear alkyl groups having from 1 to 8 carbon atoms in the basic chain; and R and R''' are chosen from linear or branched alkyl groups having from 1 to 10 carbon atoms; R and R''' being either identical or different alkyl functionalities.

BRIEF DESCRIPTION OF THE PREFERRED EMBODIMENT

The composition of the present invention can be successfully employed in conventional paint spray booth applications as an effective, more efficient substitute for conventional hydrophilic liquids such as water, organic solvents, or oil-in-water emulsions.

The present invention is predicated on the unexpected discovery that aqueous solutions containing a carbonyl compound selected from the group consisting of alcohol esters, condensation products of alcohol esters and carboxylic acid and mixtures thereof in combination with a suitable surfactant can provide a suitably stable mechanical paint overspray treatment emulsion at pH levels between 6 and 10 which is breakable at acid pH levels.

The composition of the present invention consists essentially of:

a. generally between 5 and 50% by volume with between 5–30% being preferred, and between 12 and 18% by volume being most preferred, of a carbonyl compound selected from the group consisting of alcohol esters, condensation products of alcohol esters and carboxylic acid, and mixtures thereof capable of dissolving paint and remaining insoluble in an aqueous media;

b. between about 0.1 and about 5.0% by volume, with between about 0.5 and about 2.5% by volume being preferred of an ethoxylated alkyl phenol surfactant having an average ratio of moles of ethylene oxide to moles of alkyl phenol between 4:1 to 12:1; and c. water.

The carbonyl compound employed in the composition of the present invention is a material capable of dissolving paint but which is insoluble in an aqueous media. The term "dissolving" as employed herein is defined as a process which encompasses both dispersal and passing into solution or solubilization of paint. The term "insoluble" is defined as having a solubility index of less than about 2 μg/liter.

The carbonyl compound employed in the present invention is selected from the group consisting of carbonyl compounds having the general formulae:

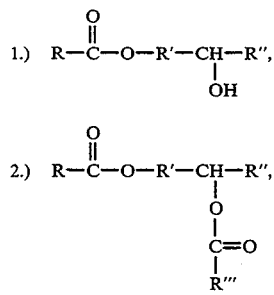

and mixtures thereof; wherein R' and R" are chosen from substituted and unsubstituted secondary alkyl groups having between 1 and 8 carbon atoms in the main chain; and R and R''' are chosen from linear or branched alkyl groups having between 1 and 10 carbon atoms wherein R and R''' may be either identical or different alkyl functionalities. In the preferred embodiment R' and R" are chosen from the group consisting of unsubstituted ethyl, propyl, butyl, pentyl, and hexyl, functionalities as well as the mono-,di- and tri-alkyl substituted derivatives thereof such as methyl propyl, methyl butyl, ethyl butyl, methyl propyl, dimethyl butyl, dimethyl pentyl, or trimethyl pentyl functionalities. R and R''' are chosen from the group consisting of propyl, isoprypyl, butyl, isobutyl, or t-butyl functionalities.

The preferred carbonyl compound generally has physical characteristics within the parameters set forth in Table I with a carbonyl compound selected from the group consisting of 2,2,4-trimethyl-1,3-pentanediol monoisobutyrate, 2,2,4-trimethyl-1,3-pentanediol diisobutyrate, and mixtures thereof being preferred.

TABLE I

| PHYSICAL CHARACTERISTICS OF CARBONYL COMPOUND | |
|---|---|
| Boiling Point | 200° to 300° C. |
| Specific gravity (20° C.) | 0.94 to 0.955 |
| Water solubility | Insoluble |
| Viscosity (20° C.) | 8 to 14 cP |
| Vapor Pressure | <0.01 mm Hg (at 20° C. and 1 atom) |

In the composition of the present invention, the carbonyl compound is present from about 5 to about 50 percent by volume based on the total composition weight with the remainder being water. In actual usage, the alcohol ester of the present invention comprises between about 5 and about 30% by volume with amounts between about 12% and about 18% by volume being preferred.

The composition of the present invention also contains a suitable surfactant which is nonionic in nature and is non-reactive in or with water; i.e. does not ionize in water or hydrolyze in aqueous acidic or alkaline solutions. The nonionic surfactants which are advantageously employed in the composition of the present invention are generally the polyoxyalkalene adducts of hydrophobic bases in which the oxygen/carbon atom ratio in the oxyalkalene portion of the molecule is greater than 0.40. Those compositions which are condensed with hydrophobic bases to provide a polyoxyalkalene portion having an oxygen/carbon atom ratio greater than 0.40 include ethylene oxide, butadiene oxide, glycidol and mixtures of these alkylene oxides with one another and with minor amounts of propylene oxide, butylene oxide, amylene oxide, styrene oxide, and other high molecular weight alkylene oxides. In the preferred embodiment, ethylene oxide is condensed with the hydrophobic base in an amount sufficient to impart surface active properties to the molecule being prepared but in an amount low enough for the molecule to exhibit little or no water solubility. The exact amount of ethylene oxide condensed with the hydrophobic base will depend on the hydrophobic base employed and is readily apparent to those of ordinary skill in the art relating to the synthesis of oxyalkalene surfactant condensates.

Typical hydrophobic bases which can be condensed with ethylene oxide in order to prepare nonionic surface active agents include mono alkyl phenols. The alkyl substituent on the aromatic nucleus may be octyl, diamyl, m-dodecyl, polymerized propylene such as propylene tetramer and trimer, isooctyl, nonyl, etc. with nonyl phenols being the preferred hydrophobic base.

The polyoxyalkalene adducts of alkyl phenol which can be employed in the present invention have an average mole ratio of ethylene oxide to alkyl phenol between 4:1 and 20:1 E.O. to alkyl phenol respectively, with a ratio of 4:1 to 8:1 being preferred. Preferably the surfactant is selected from the group consisting of octylphenoxypolyoxyethylene alcohols, diamylphenoxypolyoxyethylene alcohols, m-dodecylphenoxypolyoxyethylene alcohols, isooctylphenoxypolyoxyethylene alcohols, nonylphenoxypolyoxyethlene alcohols and mixtures thereof. The preferred materials have a E.O alkyl phenol ratio in the preferred range with ethoxylated nonyl phenols being the most preferred material. Such materials are well known products which, preferably, have the characteristics set forth in Table II. Such materials are commercially available from various sources. Preferred surfactants for use in the present invention are designated in CFTA nomenclature as being selected from the group consisting of nonoxynol-4, nonoxynol-6, nonoxynol-8 and mixtures thereof, with nonoxynol-4 being preferred.

TABLE II

PHYSICAL CHARACTERISTICS OF SURFACTANT

| CFTA Nomenclature | Nonoxynol-4 | Nonoxynol-6 | Nonoxynol-8 |
|---|---|---|---|
| Solidification Point, °C. | −29 | −34 | 0 |
| Pour Point, °C. | −20 | −29 | −5 |
| Hydroxyl Number | 140–143 | 115–118 | 94–97 |
| Approximate HLB | 9 | 11 | 12 |
| Moles of EO, average | 4 | 6 | 8 |
| Density, lbs/gal @ 25° C. | 8.5 | 8.7 | 8.6 |

Without being bound to any theory, it is believed that the alcohol esters defined in the present invention exhibit qualities which permit the material both to maintain paint overspray in the treatment solution and to create a composition which exhibits the behavior of an emulsion or a pseudo-emulsion. It is also theorized that the carbonyl component of the composition may function synergistically with the surfactant component to yield an emulsion or emulsion-like material with sufficient stability to be maintainable in an environment where it is exposed to minor amounts of mechanical agitation such as would be exerted on the composition through paint spray booth recirculation systems.

The dispersion or emulsion-like state of the composition of the present invention can be readily formed by mechanical agitation and unexpectedly permits easy breakage of the emulsion into its hydrophilic and hydrophobic component parts when loaded with paint solids upon acidication to a pH below about 6, with a pH below about 4,0 being preferred.

In the preferred embodiment, the composition of the present invention contains between about 15% and about 17% of a carbonyl compound selected from the group consisting of 2,2,4-trimethyl-1,3-pentanediol monoisobutyrate, 2,2,4-trimethyl-1,3-pentanedioldiisobutyrate, and mixtures thereof; between about 1.0 and about 2.5% of a suitable surfactant with the balance being water. The material is maintained at a pH between about 7.5 and about 12, with a pH between about 7.5 and about 9.0 being preferred.

In order to further illustrate the composition of the present invention, the following Examples are submitted. It is submitted that these examples are for illustrative purposes only and are not to be construed as limitations of or on the present invention.

FORMULATIONS 1–6A

In order to compare the effectiveness of overspray treatment compositions containing secondary alcohol esters, and/or condensation products of secondary alcohol esters and carboxylic acid with conventional non-alcohol formulations, six test emulsions were prepared. Formulation 1 was a conventional oil-in-water emulsion in which the organic (oil and oleic acid) phase constituted 30% by volume of the initial emulsion. Formulations 2 and 4 were modified oil-in-water emulsions containing dialkyl dibasic acids (DBE) as outlined in U.S. Pat. No. 4,919,691 to Patzelt at concentrations of 6% by volume and 12% by volume respectively. The total organic content of Formulation 2 was 30% by volume and in Formulation 4, it was 23% by volume. In Formulation 3, the DBE in Formulation 2 was substituted with diisobutyl esters (DIB). The total initial organic content of this Formulation was 30% by volume.

Formulations 5 and 6 were prepared according to the disclosure of U.S. Ser. No. 07/790,650 (now U.S. Pat. No. 5,200,104) which is incorporated herein by reference to contain 2,2,4-trimethyl-1,3-pentanediol monoisobutyrate (2,2,4 MONO) and 2,2,4-trimethyl-1,3-pentanediol diisobutyrate (2,2,4 DIISO), respectively, in the proportions outlined in Table III, the total initial organic content of these Formulations was 18% by volume.

Formulations 5A and 6A were prepared according to the disclosure of U.S. Ser. No. 07/861,091 (now U.S. Pat. No. 5,198,143) which is incorporated herein by reference. Formulation 5A contained 2,2,4-trimethyl-1,3 pentanediol monoisobutyrate and an oleic acid emulsifier in the amount outlined in Table IIIA. Formulation 6A was prepared to contain 2,2,4 MONO, oleic acid and the surfactant nonylphenoxypolyoxyethylene ethanol (NONOXYNOL-4) in the amount outlined. The total initial organic content of these formulations was 18 and 21% by volume respectively.

The pH of each Formulation was measured and is recorded in Tables III and IIIA, respectively.

EXAMPLES 1–5, 5A and 6A

In order to ascertain the relative stability of the various formulations, Formulations 1–5 were agitated at high speed for approximately 1 minute and allowed to sit undisturbed for at least seven days. The formulations were agitated 15 minutes prior to sampling. Aqueous, organic, and solid concentrations were determined by acidifying and centrifuging an aliquot of the formulation. The mass balance was calculated and the data is presented in Table IV.

As shown in Table IV, formulations containing DBE show a decrease in final organic mass indicating the loss of a portion of the organic phase in the aqueous phase due to hydrolysis. No appreciable hydrolysis was detected in the oil/DIB-in water sample or in the formulations 5, 5A or 6A.

EXAMPLES 6–37

Actual effectiveness of the various formulations in treating oversprayed paint was determined by admixing a predetermined amount of a commercially available automotive paint with the given formulation and agitating at high speed for one minute. In all, four commercially available paint formulations were employed with the formulations outlined in Tables III and IIIA: MFGR "A" Clear Coat, MFGR "B" Base Coat, MFGR "A" Prime, and MFGR "C" Base Coat. These paint formulations are proprietary materials commercially available from various companies. The procedures employed in testing were those outlined previously in Examples 1–5, 5A and 6A. The data were collected and are set forth in Table V.

In the formulations prepared according to the present invention, the paint solids did not separate from the oil phase in all cases. Therefore, a mass balance of the sum of the organic and solid phases was determined. This data is also presented in Table V. The mass balance of the formulations of the present invention are significantly greater, in all of the examples cited, than the mass balance of the conventional formulations.

From the foregoing, it can be concluded that treatment compositions containing secondary alcohol esteric materials such as 2,2,4-trimethyl-1,3-pentanediol, monoisobutyrate or 2,2,4 trimethyl-1,3-pentanediol diisobutyrate provide enhanced paint solids containment at lower total organic concentrations with better organic and solids recovery than conventional overspray treatment compositions.

EXAMPLES 38–41

Paint overspray treatment compositions such as those outlined in Formulations 5, 6, 5A and 6A are employed in paint spray booths under conventional operating conditions for an operating period of 10 days. Make up volumes water and treatment solution are added as necessary.

At the end of the 10 day internal a marked increase in foaming is noted in each composition. It is hypothesized that continued increase in foaming could interfere with the optimum paint containment characteristics of the material and function of the paint spray booth. Samples of each Formulation are removed for analysis. Analysis of each sample indicates the pressure of sodium oleate in amounts equal to or exceeding 12% of the total initial concentration of oleic acid.

EXAMPLES 42–43

Paint overspray treatment compositions are prepared according to the disclosure of the present invention containing 2,2,4 MONO and 2,2,4 DIISO respectively together with the surfactant nonylphenoxypolyoxyethylene ethanol (NONOXYNOL-4) in the proportions outlined in Table VI. The pH of each Formulation is outlined in Table VI.

The total initial organic content for these formulations is 18% by volume.

In order to ascertain the relative stability of the formulations, Formulations 7 and 8 are agitated at high speed for approximately 1 minute and is allowed to sit undisturbed for at least seven days. The formulations are agitated 15 minutes prior to sampling. Aqueous, organic and solid concentrations are determined by acidifying and centrifuging an aliquot of the formulation. The mass balance which can be calculated from this data will indicate that no appreciable hydrolysis will be detected in the formulations.

EXAMPLES 44–45

Samples of Formulations 5A, 6A, 7 and 8 are agitated to emulsify the organic material in the aqueous solution. The stability of the emulsion relative to formulations 5A and 6A are observed. Heretofore it was believed that formulations which lacked the oleic acid emulsifier would fail to form emulsions. However, contrary to that prediction, Formulations 7 and 8 which lack an emulsifier to exhibit sufficient emulsion-like characteristics to permit their use as paint overspray treatment compositions.

Without being bound to any theory, it is believed that this characteristic is due, at least in part, to unexpected heretofore unappreciated emulsification properties of the alcohol esteric compounds employed in the present invention when the composition is subjected to mechanical emulsification.

TABLE III

| | TEST OVERSPRAY TREATMENT COMPOSITIONS | | | | | |
|---|---|---|---|---|---|---|
| RAW MATERIALS | 1 | 2 | 3 | 4 | 5 | 6 |
| | VOLUME OF RAW MATERIALS (ml) | | | | | |
| 100 SECOND OIL | 55.8 | 44.6 | 44.6 | 18.6 | | |
| OLEIC ACID | 4.2 | 3.4 | 3.4 | 3.4 | 6.0 | 6.0 |
| DBE | | 12.0 | | 24.0 | | |
| DIB | | | 12.0 | | | |
| 224 MONO | | | | | 30.0 | |
| 224 DIISO | | | | | | 30.0 |
| WATER | 140.0 | 140.0 | 140.0 | 154.0 | 164.0 | 164.0 |
| TOTAL | 200.0 | 200.0 | 200.0 | 200.0 | 200.0 | 200.0 |
| | PERCENT VOLUME OF RAW MATERIALS (%) | | | | | |
| 100 SECOND OIL | 28 | 22 | 22 | 9 | 0 | 0 |
| OLEIC ACID | 2 | 2 | 2 | 2 | 3 | 3 |
| DBE | 0 | 6 | 0 | 12 | 0 | 0 |
| DIB | 0 | 0 | 6 | 0 | 0 | 0 |
| 224 MONO | 0 | 0 | 0 | 0 | 15 | 0 |
| 224 DIIISO | | | | | | 15 |
| WATER | 70 | 70 | 70 | 77 | 82 | 82 |
| OIL PHASE | 30 | 30 | 30 | 23 | 18 | 18 |
| PH | 8.48 | 8.60 | 8.90 | 8.70 | 8.75 | 8.80 |

TABLE IIIA

| TEST OVERSPRAY TREATMENT COMPOSITIONS | | |
|---|---|---|
| RAW MATERIALS | 5A | 6A |
| VOLUME OF RAW MATERIALS (ml) | | |
| 100 SECOND OIL | | |
| OLEIC ACID | 6.0 | 6.0 |
| DBE | | |
| DIB | | |
| 224 MONO | 30.0 | 30.0 |
| NONOXYNOL-4 | | 6.0 |
| WATER | 164.0 | 158.0 |
| TOTAL | 200.0 | 200.0 |
| PERCENT VOLUME OF RAW MATERIALS (%) | | |
| 100 SECOND OIL | 0 | 0 |
| OLEIC ACID | 3 | 3 |
| DBE | 0 | 0 |
| DIB | 0 | 0 |
| 224 MONO | 15 | 15 |
| NONOXYNOL-4 | | 3 |
| WATER | 82 | 79 |
| ORGANIC PHASE | 18 | 21 |
| PH | 8.75 | 8.80 |

TABLE IV

STABILITY OF TEST EMULSIONS (EXAMPLES 1-5, 5A AND 6A)

| FORMULA NUMBER | INITIAL EMULSION ORGANIC CONC. (%) | PAINT ADDED TO EMULSION CONC. (%) | EMULSION AFTER SEVEN DAYS (%) ORGANIC | (%) WATER | (%) SOLIDS | ORGANIC MASS BALANCE |
|---|---|---|---|---|---|---|
| 1 | 27 | 0 | 28 | 72 | 0 | 103 |
| 2 | 27 | 0 | 24 | 76 | 0 | 90 |
| 3 | 27 | 0 | 29 | 71 | 0 | 105 |
| 4 | 21 | 0 | 8 | 92 | 0 | 39 |
| 5 | 16 | 0 | 16 | 84 | 0 | 100 |
| 5A | 15 | 0 | 15 | 85 | 0 | 100 |
| 6A | 19 | 0 | 21 | 17 | 0 | 109 |

TABLE V

EFFECTIVENESS OF TEST FORMULATIONS IN DISPERSING VARIOUS PAINT SOLIDS THEREIN

| FORMULA NUMBER | INITIAL EMULSION ORGANIC CONC. (%) | PAINT ADDED TO EMULSION CONC. (%) | EMULSION AFTER SEVEN DAYS (%) ORGANIC | (%) WATER | (%) SOLIDS | ORGANIC & SOLIDS MASS BALANCE |
|---|---|---|---|---|---|---|
| *1 MFGR "A" CLEAR COAT (EXAMPLES 6-13)* | | | | | | |
| 1 | 27 | 10 | 27 | 69 | 4 | 84 |
| 2 | 27 | 10 | 21 | 75 | 4 | 67 |
| 3 | 27 | 10 | 26 | 70 | 4 | 80 |
| 4 | 21 | 10 | 8 | 77 | 15 | 74 |
| 5 | 16 | 10 | 0 | 74 | 26 | 99 |
| 6 | 16 | 10 | 0 | 73 | 27 | 104 |
| 5A | 15 | 14 | 0 | 83 | 17 | 58 |
| 6A | 19 | 14 | 0 | 73 | 27 | 82 |
| *2 MFGR "B" BASE COAT (EXAMPLES 14-21)* | | | | | | |
| 1 | 27 | 10 | 27 | 71 | 2 | 78 |
| 2 | 27 | 10 | 6 | 90 | 4 | 27 |
| 3 | 27 | 10 | 24 | 69 | 6 | 82 |
| 4 | 21 | 10 | 7 | 80 | 13 | 63 |
| 5 | 16 | 10 | 24 | 71 | 4 | 108 |
| 6 | 16 | 10 | | | | |
| 5A | 15 | 14 | 23 | 21 | 6 | 102 |
| 6A | 19 | 14 | 25 | 71 | 4 | 88 |
| *3 MFGR "A" PRIME (EXAMPLES 22-29)* | | | | | | |
| 1 | 27 | 10 | 29 | 71 | 0 | 78 |
| 2 | 27 | 10 | 4 | 96 | 0 | 11 |
| 3 | 27 | 10 | 17 | 83 | 0 | 45 |
| 4 | 21 | 10 | 8 | 85 | 6 | 47 |
| 5 | 16 | 10 | 0 | 75 | 25 | 95 |
| 6 | 16 | 10 | 0 | 77 | 23 | 87 |
| 5A | 15 | 14 | 0 | 76 | 24 | 82 |
| 6A | 19 | 14 | 0 | 73 | 27 | 82 |
| *4 MFGR "C" BASE COAT (EXAMPLES 30-37)* | | | | | | |
| 1 | 27 | 10 | 27 | 73 | 0 | 73 |
| 2 | 27 | 10 | 9 | 91 | 0 | 23 |
| 3 | 27 | 10 | 24 | 71 | 4 | 77 |
| 4 | 21 | 10 | 4 | 94 | 2 | 19 |
| 5 | 16 | 10 | 22 | 72 | 6 | 106 |
| 6 | NOT TESTED | | | | | |
| 5A | 16 | 14 | 22 | 73 | 4 | 93 |
| 6A | 19 | 14 | 6 | 76 | 18 | 74 |

TABLE VI

TEST OVERSPRAY TREATMENT COMPOSITIONS VOLUME OF RAW MATERIALS (ml)

| RAW MATERIALS | 7 | 8 |
|---|---|---|
| 224 MONO | 30.0 | |
| 224 DIISO | | 30.0 |
| NONOXYNOL-4 | 6.0 | 6.0 |
| WATER | 164.0 | 164.0 |
| TOTAL | 200.0 | 200.0 |

Having thus described the composition of the present invention, what is claimed is:

1. A composition for treating oversprayed paints consisting essentially of:

between about 5 and about 50 percent by volume of carbonyl compound selected from the group consisting of alcohol esters, condensation products of alcohol ester and carboxylic acid, and mixtures thereof, said carbonyl compound being capable of dissolving paint while remaining essentially insoluble and non-reactive with an aqueous media;

from about 0.1 to about 5.0% by volume of a surfactant selected from the group consisting of ethoxylated alkyl phenols having an average ratio of moles of ethylene oxide to moles of alkyl phenol between about 4:1 and about 12:1; and water.

2. The composition of claim 1 wherein said carbonyl compound is selected from the group consisting of
1. alcohol esters having the general formula:

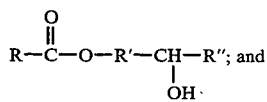

2. condensation products of alcohol ester and carboxylic acid having the general formula:

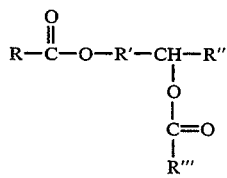

and mixtures thereof, wherein R' and R" are chosen from the group consisting of substituted alkyl groups, unsubstituted alkyl groups and mixtures thereof, said substituted and unsubstituted alkyl groups having from 1 to 8 carbon atoms, wherein R and R''' are chosen from the group consisting of linear alkyl groups having from 1 to 10 carbon atoms, branched alkyl groups having from 1 to 10 carbon atoms, R and R''' being either identical or different alkyl functionalities.

3. The composition of claim 1 wherein said carbonyl compound is selected from the group consisting of secondary alcohol esters, condensation products of secondary alcohol esters and carboxylic acid, and mixtures thereof.

4. The composition of claim 3 wherein said carbonyl compound is selected from the group consisting of secondary propanol esters, secondary butanol esters, secondary pentanol esters, condensation products of secondary propanol esters and carboxylic acid, condensation products of secondary butanol esters and carboxylic acid, condensation products of secondary pentanol esters and carboxylic acid and mixtures thereof.

5. The composition of claim 1 wherein said carbonyl compound is selected from the group consisting of 2,2,4-trimethyl-1,3-pentanediol monoisobutyrate, 2,2,4-trimethyl-1,3-pentanediol diisobutyrate, and mixtures thereof and is present in an amount between about 5 and about 30% by volume.

6. The composition of claim 1 wherein said ethoxylated alkyl phenol surfactant is selected from the group consisting of nonylphenoxypolyoxyethylene ethanol, octylphenoxypolyoxyethylene ethanol, diamylphenoxypolyoxyethylene ethanol, m-dodeylphenoxypolyoxyethylene ethanol, isooctylphenoxypolyoxyethylene ethanol, and mixtures thereof.

7. The composition of claim 6 wherein said surfactant has an average ratio of moles of ethylene oxide to moles of alkyl phenol between about 4:1 and about 8:1.

8. The composition of claim 7 wherein said surfactant is present in an amount between about 0.5 and 2.5% by volume.

9. The composition of claim 7 wherein said carbonyl compound is present in an amount less than 20% by total composition volume.

10. The composition of claim 9 wherein said carbonyl compound is present in an amount between about 12% and about 18% by total composition volume.

11. The composition of claim 9 wherein water is present in an amount greater than 75% by total composition volume.

12. A composition for treating oversprayed paints consisting essentially of:
    from about 10 to about 25% by volume of a carbonyl compound having a vapor pressure less than 0.1 mm Hg selected from the group consisting of secondary alcohol esters, condensation products of secondary alcohol esters and carboxylic acid and mixtures thereof, said carbonyl compound being capable of dissolving paint contained therein, said carbonyl compound further being insoluble and non-reactive in an aqueous media;
    from about 0.1 to about 2.5% by volume of a nonylphenoxypolyoxyethylene ethanol having an average ratio of moles of ethylene oxide to moles of alkyl phenol between about 4:1 and about 8:1; and water.

13. The composition of claim 12 wherein said carbonyl compound is selected from the group consisting of 2,2,4-trimethyl-1,3-pentanediol monoisobutyrate, 2,2,4-trimethyl-1,3-pentanediol diisobutyrate, and mixtures thereof.

14. The composition of claim 13 wherein said carbonyl compound is present in an amount between about 12% and about 18% by total composition volume.

15. A composition for treating oversprayed paints consisting essentially of:
    between about 12% and 18% by volume of a carbonyl compound selected from the group consisting of 2,2,4-trimethyl-1,3-pentanediol monoisobutyrate, 2,2,4-trimethyl-1,3-pentanediol diisobutyrate, and mixtures thereof;
    between about 0.1 and about 2.5% by volume of a nonylphenoxypolyoxyethylene ethanol surfactant having an average ratio of ethylene oxide to moles of alkyl phenol between about 4:1 and about 8:1, ethylene oxide to alkyl phenol respectively; and
    water, wherein said carbonyl compound and said surfactant combined constitute no greater than 25% by volume of said composition.

* * * * *

UNITED STATES PATENT AND TRADEMARK OFFICE
CERTIFICATE OF CORRECTION

PATENT NO. : 5,397,496
DATED : March 14, 1995
INVENTOR(S) : Edwin C. Zuerner, et al It is certified that error appears in the above-identified patent and that said Letters Patent is hereby corrected as shown below:

On the title page, item [75],

In the designation of Inventors, after "Robert" and before "Patzelt", please delete "A." and insert --R.--.

Signed and Sealed this

Fifth Day of January, 1999

Attest:

Attesting Officer

*Acting Commissioner of Patents and Trademarks*